United States Patent
Nakagawa et al.

(10) Patent No.: US 6,667,359 B1
(45) Date of Patent: Dec. 23, 2003

(54) POLYPROPYLENE COMPOSITIONS FOR AUTOMOTIVE PARTS

(75) Inventors: Masaru Nakagawa, Chiba (JP); Koki Hirano, Ichihara (JP); Yutaka Obata, Ichihara (JP); Yasuhisa Sugita, Ichihara (JP); Takao Nomura, Toyota (JP); Masatoshi Matsuda, Toyota (JP); Hisayuki Iwai, Aichi-ken (JP); Takayuki Nagai, Ann Arbor, MI (US)

(73) Assignees: Idemitsu Petrochemical Co., Ltd., Tokyo (JP); Toyota Jidosha Kabushiki Kaisha, Toyota (JP)

( * ) Notice: Subject to any disclaimer, the term of this patent is extended or adjusted under 35 U.S.C. 154(b) by 243 days.

(21) Appl. No.: 09/599,884

(22) Filed: Jun. 23, 2000

(30) Foreign Application Priority Data

Jun. 23, 1999 (JP) .............................. 11-177374

(51) Int. Cl.[7] .......................... C08K 3/34; C08L 23/14
(52) U.S. Cl. ...................... 524/451; 524/505; 525/240; 525/241; 525/242
(58) Field of Search .......................... 525/89, 98, 240, 525/241, 322, 323, 324, 242; 524/451, 505, 528, 548

(56) References Cited

U.S. PATENT DOCUMENTS

| | | | |
|---|---|---|---|
| 5,750,612 A | | 5/1998 | Zyagawa et al. |
| 5,880,198 A | * | 3/1999 | Kobayashi et al. ......... 524/451 |
| 6,011,102 A | * | 1/2000 | Shimojo et al. ............ 524/451 |
| 6,156,836 A | * | 12/2000 | Iwanami et al. ............ 524/451 |
| 6,306,972 B1 | * | 10/2001 | Ohkawa et al. ............. 525/240 |

FOREIGN PATENT DOCUMENTS

| | | |
|---|---|---|
| JP | 3-172339 | 7/1991 |
| JP | 7-053828 | 2/1995 |
| JP | 8-104792 | 4/1996 |
| JP | 10-306181 | 11/1998 |
| JP | 11-029688 | 2/1999 |

* cited by examiner

*Primary Examiner*—Robert D. Harlan
(74) *Attorney, Agent, or Firm*—Oblon, Spivak, McClelland, Maier & Neustadt, P.C.

(57) ABSTRACT

There are disclosed a polypropylene composition for automotive parts which has a melt index at 230° C. and at 2.16 kgf of at least 30 g/10 minutes and which comprises 55 to 60% by weight of (1) propylene/ethylene block copolymer; 20 to 25% by weight of (2) rubber comprising a styrene/ethylene/propylene/styrene block copolymer and/or a styrene/ethylene/1-butene/styrene block copolymer and an olefinic elastomer; and 18 to 23% by weight of (3) talc, and also an automotive part which comprises the above polypropylene composition.

12 Claims, 2 Drawing Sheets

POLYPROPYLENE COMPOSITIONS FOR AUTOMOTIVE PARTS

BACKGROUND OF THE INVENTION

1. Field of the Invention

The present invention relates to polypropylene compositions which are well suited for automotive interior parts such as an instrument panel and also automotive exterior parts such as a bumper and side mole. More particularly, the present invention is concerned with polypropylene compositions which are employed for automotive parts, are excellent in the balance among various strengths that is required particularly in automotive interior parts and automotive exterior parts, have high fluidity and a low coefficient of thermal linear expansion, have good external appearance and low dimensional change upon heating, are capable of decreasing the wall thickness of an automotive part as compared with the conventional material, and thereby contribute to the lightweightness of an automobile itself. The present invention is further concerned with automotive parts which take advantage of the above-mentioned polypropylene compositions.

2. Description of the Related Arts

As a raw material for automotive interior parts and exterior parts, polypropylene compositions are employed in many cases for their lightweightness and the freedom of design due to easiness of processing. In recent years, however, there has been required the development of a polypropylene composition which is enhanced in rigidity, fluidity and impact resistance and is lessened in molding shrinkage factor and dimensional change at the time of baking coating in order to make it possible to produce automotive interior and exterior parts further decreased in wall thickness and improved in external appearance.

With regard to a polypropylene composition for automotive exterior parts which is excellent in rigidity and moldability, there are disclosed a polypropylene composition comprising a propylene/ethylene block copolymer having an increased melt flow rate (MFR) in Japanese Patent Application Laid-Open No. 98123/1993 (Heisei-5); a polypropylene composition comprising a multistage-polymerized propylene/ethylene block copolymer having specific properties and talc blended therewith in Japanese Patent Application Laid-Open No.98125/1993 (Heisei-5); and a polypropylene composition comprising a propylene based polymer, a styrene based block copolymer, an inorganic filler and a nucleating agent in Japanese Patent Application Laid-Open No.227735/1997 (Heisei-9).

With regard to a polypropylene composition for automotive interior parts which is excellent in rigidity and moldability, there are disclosed a polypropylene composition comprising a propylene/ethylene block copolymer having specific properties, a styrene based block copolymer having specific properties or ethylene/α-olefin block copolymer having specific properties and talc blended therewith in Japanese Patent Application Laid-Open No.53828/1995 (Heisei-7); a polypropylene composition comprising a propylene/ethylene block copolymer having specific properties, a hydrogenated polybutadiene based block copolymer having specific properties and talc blended therewith in Japanese Patent Application Laid-Open No.104792/1996 (Heisei-8); a polypropylene composition comprising a propylene/ethylene block copolymer having specific fluidity, a hydrogenated block copolymer having specific properties and talc having specific properties and blended therewith in Japanese Patent Application Laid-Open No.20684/1996 (Heisei-8); a polypropylene composition comprising a propylene/ethylene block copolymer having specific properties, a thermoplastic elastomer having specific properties and talc having specific properties and blended therewith in Japanese Patent Application Laid-Open No.306181/1998 (Heisei-10); and a polypropylene composition comprising a propylene/ethylene block copolymer having specific properties, an ethylene/octene copolymer having specific properties, an ethylene/butene copolymer having specific properties and a styrene based block copolymer having specific properties or an olefin based block copolymer having specific properties and talc having specific properties and blended therewith in Japanese Patent Application Laid-Open No.29688/1999 (Heisei-11).

With regard to a polypropylene composition which is excellent in rigidity and moldability, and is usable for both automotive interior parts and automotive exterior parts, there is disclosed a polypropylene composition comprising a propylene/ethylene block copolymer having specific properties, a styrene based copolymer having specific properties and talc blended therewith in Japanese Patent Application Publication No.25986/1995 (Heisei-7).

Nevertheless, in the case of the polypropylene composition according to Japanese Patent Application Laid-Open No.98123/1993 (Heisei-5), by an increased MFR of the propylene/ethylene block copolymer, it is made possible to produce automotive exterior parts sufficiently filled in a mold, but the impact resistance thereof is deteriorated to a great extent. In the case of the polypropylene composition according to Japanese Patent Application Laid-Open No.98125/1993 (Heisei-5), the production of automotive exterior parts having a wall thickness smaller than that of conventional parts leads to insufficiency of not only rigidity and mechanical strength but also fluidity. In particular, when an attempt is made to produce a large sized and thin-walled automotive exterior part by molding, it is possible to produce nothing but a short shot molding insufficiently filled in a mold. In the case of the polypropylene composition according to Japanese Patent Application Laid-Open No.227735/1997 (Heisei-9), it is made possible to produce a molding sufficiently filled in a mold, but there is caused insufficient balance among rigidity, impact resistance, molding shrinkage factor and dimensional change at the time of baking coating.

In addition, in the case of the polypropylene composition according to any of Japanese Patent Application Laid-Open Nos.53828/1995 (Heisei-7), 104792/1996 (Heisei-8), 20684/1996 (Heisei-8), 306181/1998 (Heisei-10), and 29688/1999 (Heisei-11), and Japanese Patent Publication No.25986/1995 (Heisei-7), when an attempt is made to produce automotive interior parts having a wall thickness smaller than that of conventional parts, it is possible to produce nothing but molded articles inferior in weld appearance, and besides because of insufficiency of rigidity, mechanical strength and fluidity, when a large sized and thin-walled automotive interior part is produced by molding, it is possible to produce nothing more than short shot molded articles which is insufficiently filled in a mold and is inferior in surface smoothness thereon.

SUMMARY OF THE INVENTION

Under such circumstances, it is a general object of the present invention to solve the above-mentioned outstanding problems; to provide polypropylene compositions which are employed for automotive parts, have excellent moldability and high rigidity, are excellent in the balance among mechanical strength such as impact resistance and ductility, thermal deformation resistance and brittleness temperature, are further excellent in external appearance for weld and flow mark, are lessened in dimensional change at the time of baking coating and coefficient of thermal linear expansion, and in particular are capable of producing automotive interior and exterior parts having a wall thickness smaller than that of the conventional automotive parts; and to provide automotive parts which take advantage of the above-mentioned polypropylene compositions.

In view of the foregoing, intensive extensive research and investigation were accumulated by the present inventor in order to achieve the above-mentioned object. As a result, the present invention has been accomplished.

Specifically, the polypropylene composition for automotive parts according to the present invention comprises 55 to 60% by weight of (1) propylene/ethylene block copolymer which comprises 85 to 96% by weight of (A) a component which has an intrinsic viscosity at 135° C. in decalin $\{\eta\}$ of 0.6 to 0.95 dl/g, has a stereoregularity index of at least 98.8%, and is insoluble in p-xylene at 25° C. and also in boiling n-heptane; and 4 to 15% by weight of (B) a component which has an intrinsic viscosity at 135° C. in decalin $\{\eta\}$ of 5 to 11 dl/g, contains 15 to 37% by weight of a unit that is derived from ethylene, and is soluble in p-xylene at 25° C.; the block copolymer having (C) at most 15% by weight of a content of polyethylene component and having a melt index at 230° C. and at 2.16 kgf of 110 to 200, 20 to 25% by weight of (2) rubber which comprises (D) a styrene/ethylene/propylene/styrene block copolymer and/or a styrene/ethylene/1-butene/styrene block copolymer, each copolymer having a melt flow rate at 230° C. and at 2.16 kgf of 1 to 10 g/10 minutes and comprising a styrene polymerized portion of 10 to 25% by weight, an ethylene/1-butene polymerized portion and/or an ethylene/propylene copolymerized portion; and (E) an olefinic elastomer having a density of 0.85 to 0.87 g/cm$^3$ and a melt index at 230° C. and at 2.16 kgf of 0.5 to 5 g/10 minute, wherein the content of the component (D) $\{x\}$ and the content of the component (E) $\{y\}$ satisfy the relational expression: $0.05<x/(x+y)<0.3$, and 18 to 23% by weight of (3) talc which has an average particle diameter as measured by laser diffraction method of 3 to 6 $\mu$m, an SiO$_2$ content of 58 to 63% by weight, an MgO content of 30 to 33% by weight, and a peak intensity which lies in the range of 32±1 degrees of the scattering angle (2θ) in a wide angle X ray diffraction image being at most 10% of a peak intensity which lies in the range of 8 to 10 degrees of said angle (2θ) in said image, (4) said polypropylene composition being characterized by its having a melt index at 230° C. and at 2.16 kgf of at least 30 g/10 minutes.

It is preferable that the aforesaid olefinic elastomer as the component (E) be ethylene/1-butene rubber (EBM) or ethylene/1-octene rubber (EOM).

It is preferable that the above-mentioned content of the component (D) $\{x\}$ and content of the component (E) $\{y\}$ satisfy the relational expression: $0.15<x/(x+y)<0.25$.

DESCRIPTION OF THE PREFERRED EMBODIMENTS

In the following, detailed description will be given of each of the components which constitute the polypropylene composition for automotive parts according to the present invention.

(1) ethylene/propylene block copolymer

The ethylene/propylene block copolymer as the component (1) needs to contain the under-mentioned components, and the process for producing said copolymer is not specifically limited. For instance, the copolymer is produced by a multi-stage polymerization process comprising the first step of producing at least two kinds of homopolypropylene having a different molecular weight from one another by polymerizing propylene and the second step of producing at least two kinds of ethylene/propylene copolymer having a different ethylene content and a different molecular weight from one another by the use of ethylene. The copolymer may be produced by a process which comprises blending polypropylene and ethylene/propylene copolymer that have been separately prepared by means of conventional melt kneading, solution mixing or the like.

(A) Component which is insoluble in p-xylene at 25° C. and also in boiling n-heptane ① Production of the component which is insoluble in p-xylene at 25° C. and also in boiling n-heptane The component which is insoluble in p-xylene at 25° C. and also in boiling n-heptane is obtained by the following process. (a) A sample of the ethylene/propylene block copolymer in an amount of 5±0.05 g is accurately weighed in a 1000 ml Kjeldahl short neck flask, further 1±0.05 g of BHT (antioxidant) is added to the sample, and thereafter a rotator and 700±10 ml of p-xylene are placed in the flask. (b) Then, the Kjeldahl short neck flask is equipped with a cooler and is heated in an oil bath at 140±5° C. for 120±30 minutes, while the rotator is operated so that the sample is dissolved in the p-xylene. Thereafter the content in the flask is poured in a 1000 ml beaker, is allowed to cool to room temperature (25° C.) for at least 8 hours, while the solution in the beaker is stirred with a stirrer. Then the resultant deposit is collected with a wire net, and again dissolved in p-xylene in the similar manner as in the methods (a) and (b). The resultant solution is added to 2000±100 ml of methanol which has been housed in 3000 ml beaker while being hot, stirred with a stirrer for at least 2 hours, and is allowed to stand overnight at room temperature (25° C.). Then the resultant deposit is collected with a wire net, dried in the air for at least 5 hours, thereafter dried in a vacuum drier at 100±5° C. for 240 to 270 minutes to obtain the objective component which is insoluble in p-xylene.

One gram of the p-xylene insoluble portion thus obtained was extracted with boiling n-heptane for 6 hours by the use of a Soxhlet extractor, dried in the air for at least 5 hours, thereafter dried in a vacuum drier at 60±5° C. for 240 to 270 minutes to obtain the objective component which is insoluble in p-xylene and also boiling n-heptane.

② Measurement of intrinsic viscosity $\{\eta\}$

A sample is dissolved in decalin, and the intrinsic viscosity $\{\eta\}$ thereof is measured at 135° C.

③ Measurement of stereoregularity index

The stereoregularity index of a sample is obtained by measuring the $^{13}$C-NMR of boiling n-heptane insoluble portion, and calculating the absorption peak heights $P_{mmmm}$, $P_{mmmr}$, $P_{mmrr}$, $P_{mmrm+rrmr}$, $P_{rrrr}$ and $P_{mrrm}$ assigned to mmmm (chemical shift of 21.86 ppm) of methyl region, mmmr (chemical shift of 21.62 ppm) thereof, mmrr (chemical shift of 21.07 ppm) thereof, mmrm+rrmr (chemical shift of 20.88 ppm) thereof, rrrr (chemical shift of 20.36 ppm) thereof and mrrm (chemical shift of 19.95 ppm) thereof, respectively by the following formula:

Stereoregularity index (%)=$P_{mmmm}$×100/($P_{mmmm}$+$P_{mmmr}$+$P_{mmrr}$+$P_{mmrm+rrmr}$+$P_{rrrr}$+$P_{mrrm}$)

wherein the $P_{mmmm}$, $P_{mmmr}$, $P_{mmrr}$, $P_{mmrm+rmr}$, $P_{rrrr}$ and $P_{mrrm}$ were determined by the height from the base line of each corresponding peak. Since the peak assigned to mmmr lies on the tailing of the peak assigned to mmmm, $P_{mmmr}$ was determined by subtracting the tailing contribution of mmmm from the height of mmmr from the base line according to a conventional method.

A measurement was made of the $^{13}$C-NMR of the boiling n-heptane insoluble portion under the following conditions.

Solvent: mixed solvent of 1,2,4-trichlorobenzene/ deuterated benzene (90/10 vol %)
Concentration: 150 mg/3 ml
Dissolution temperature: 140° C.
Measuring instrument: JNM-EX400NMR measuring instrument produced by JEOL Ltd.
Pulse width: 8.7 μs/45°
Pulse repeating time: 4s
Measurement temperature: 130° C.
Number of integration: 1000 times With regard to the above-mentioned component (A), the intrinsic viscosity {η} is in the range of 0.6 to 0.95 dl/g, preferably 0.7 to 0.9 dl/g. The intrinsic viscosity, when being less than 0.6 dl/g, brings about insufficient impact resistance of the molded articles to be produced, whereas the intrinsic viscosity, when being more than 0.95 dl/g, leads to insufficient fluidity thereby causing incapability of molding thin walled automotive parts. The stereoregularity index is at least 98.8%, preferably at least 99.0%. The stereoregularity index, when being less than 98.8%, results in insufficient rigidity of the molded articles to be produced. The amount of the component which is insoluble in p-xylene at 25° C. and in boiling n-heptane is 85 to 96% by weight, preferably 88 to 93% by weight. The amount thereof, when being less than 85% by weight, brings about insufficient rigidity of the molded articles to be produced, whereas said amount, when being more than 96% by weight, leads to lowered elongation thereof and inferior appearance of flow marks.

(B) component which is soluble in p-xylene at 25° C.

① Production of the component which is soluble in p-xylene at 25° C.

The component which is soluble in p-xylene at 25° C. (the amount: W) is obtained by the following process. A sample of the ethylene/propylene block copolymer in an amount of 5±0.05 g is accurately weighed in a 1000 ml Kjeldahl short neck flask, further 1±0.05 g of BHT (antioxidant) is added to the sample, and thereafter a rotator and 700±10 ml of p-xylene are placed in the flask. (b) Then, the Kjeldahl short neck flask is equipped with a cooler and is heated in an oil bath at 140±5° C. for 120±30 minutes, while the rotator is operated so that the sample is dissolved in the p-xylene. Thereafter the content in the flask is poured in a 1000 ml beaker, is allowed to cool to room temperature (25° C.) for at least 8 hours, while the solution in the beaker is stirred with a stirrer. Then the resultant deposit is collected with a wire net. The resultant filtrate is further filtered with a filer paper, and the filtrate is added to 2000 ml of methanol which has been housed in 3000 ml beaker for at least 2 hours, and is allowed to stand for at least 2 hours, while being stirred with a stirrer. Then the resultant deposit is collected with a wire net, dried in the air for at least 5 hours, thereafter dried in a vacuum drier at 100±5° C. for 240 to 270 minutes to obtain the objective component which is soluble in p-xylene. Thus the amount of the component which is soluble in p-xylene (W) is calculated by the formula:

$$W \text{ (\% by weight)}=100\times C/A$$

wherein
A: amount of the sample (g)
C: amount of the collected p-xylene soluble component ② Measurement of ethylene unit amount in p-xylene soluble component A measurement was made of ethylene unit amount in p-xylene soluble component by $^{13}$C-NMR measuring method in the following manner.

An evaluation is made of p-xylene soluble component by $^{13}$C-NMR measuring method to obtain integrated intensity of the peaks I (Tδδ), I (Tβδ), I (Sγδ), I (Sδδ), I (Tββ), I (Sβδ) and I (Sββ) assigned to carbon Tδδ, Tβδ, Sγδ, Sδδ, Tββ, Sβδ and Sββ, respectively. By the use of these integrated intensity of the peaks thus obtained, calculation is made of the fractions $F_{EEE}$, $f_{EPE}$, $f_{PPE}$, $f_{PPP}$ $f_{PEE}$ and $f_{PEP}$ of chain distributions of EEE, EPE, PPE, PPP, PEE and PEP triad, respectively by the following formula:

$$f_{EEE}=\{I(S\delta\delta)/2+I(S\gamma\delta)/4\}/T$$

$$f_{EPE}=I(T\delta\delta)/T$$

$$f_{PPE}=I(T\beta\delta)/T$$

$$f_{PPP}=I(T\beta\beta)/T$$

$$f_{PEE}=I(S\beta\delta)/T$$

$$f_{PEP}=I(S\beta\beta)/T$$

with the proviso that T=I (Sδδ)/2+I (Sγδ)/4+I (Tδδ)+I (Tβδ)+I (Tββ)+I (Sβδ)+I (Sββ)

The ethylene unit content (molar %) is calculated by the following formula by the use of the fractions obtained by the preceding formula:

$$\text{Ethylene unit content Et (molar \%)}=100\{f_{EEE}+2(f_{PEE}+f_{EPE})/3+(f_{PEP}+f_{PPE})/3\}$$

Lastly, ethylene unit content (% by weight) is calculated by the following formula:

$$\text{Ethylene unit content (\% by weight)}=[28Et \text{ (molar \%)}/\{28Et \text{ (molar \%)}+42(100-Et(\text{molar \%}))\}]$$

The measurement of $^{13}$C-NMR is carried out under the same conditions as in the component (A).

③ Measurement of intrinsic viscosity {η}

In the same manner as in the component (A), a sample is dissolved in decalin, and the intrinsic viscosity {η} thereof is measured at 135° C.

With regard to the above-mentioned component (B), the intrinsic viscosity {η} is in the range of 5 to 11 dl/g, preferably 5.5 to 10 dl/g. The intrinsic viscosity, when being less than 5 dl/g, brings about conspicuous flow mark of the molded article and poor external appearance, whereas the intrinsic viscosity, when being more than 11 dl/g, leads to insufficient fluidity thereby causing incapability of molding thin-walled automotive parts. The ethylene unit content is 15 to 37% by weight, preferably 19 to 33% by weight. The ethylene unit content, when being less than 15% by weight, results in insufficient rigidity of the molded articles to be produced, whereas said content, when being more than 37% by weight, brings about insufficient tensile break elongation. The amount of the component which is soluble in p-xylene at 25° C. is 4 to 15% by weight, preferably 5 to 10% by weight. The amount of said component, when being less than 4% by weight, leads to lowered elongation thereof and inferior appearance of flow marks, whereas said amount, when being more than 15% by weight, brings about insufficient rigidity of the molded articles to be produced.

(C) Content of polyethylene component

① Measurement of content of polyethylene component

The content of polyethylene component in the propylene/ethylene block copolymer is calculated by the following formula by the use of the ethylene content in p-xylene insoluble portion $Et_{insol}$ which is obtained from the method ① in the component (A) {the measuring method thereof is the same as the method for measuring ethylene unit amount in the component (B)} and the amount of the p-xylene soluble portion $F_{sol}$ which is obtained from the method ① in the component (B):

Content of polyethylene component (% by weight)=100×[{(100−$F_{sol}$)/100}×$Et_{insol}$]/[{(100−$F_{sol}$)/100}×$Et_{insol}$+$F_{sol}$]

In the above-mentioned component (C), the content of polyethylene component in the propylene/ethylene block copolymer is at most 15% by weight, preferably at most 13% by weight. The content exceeding 15% by weight brings about insufficient tensile break elongation.

The melt index (MI) of the propylene/ethylene block copolymer as the above-mentioned component (1) is in the range of 110 to 200, preferably 130 to 180. The MI, when being less than 110, leads to insufficient fluidity of the molded articles to be produced, whereas said MI, when being more than 200, brings about insufficient impact resistance thereof. On the basis of the whole polypropylene composition being 100% by weight, the amount of the propylene/ethylene block copolymer as the above-mentioned component (1), when being less than 55% by weight, leads to insufficient rigidity of the molded articles to be produced, whereas said amount, when being more than 60% by weight, brings about insufficient impact resistance at a low temperature.

Figure 1:
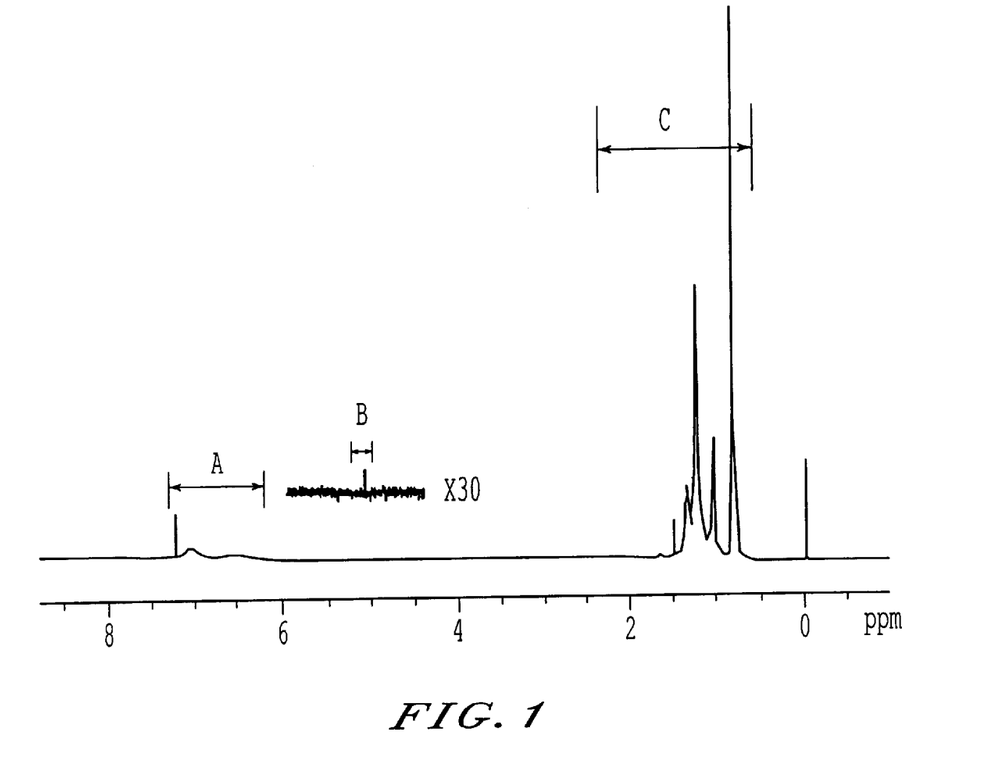
FIG. 1 is an illustration which shows an $^1$H-NMR spectrum of the styrene/ethylene/propylene/styrene block copolymer (SEPS) and FIG. 2 is an illustration which shows an $^1$H-NMR spectrum of the styrene/ethylene/1-butene/styrene block copolymer (SEBS).

(2) Rubber component (D) Styrene/ethylene/propylene/styrene block copolymer (SEPS) or styrene/ethylene/1-butene/styrene block copolymer (SEBS) and (E) olefinic elastomer ① Measurement of the content of styrene polymerized portion in SEPS The spectrum as shown in FIG. 1 is obtained as the result of measuring $^1$H-NMR spectrum of SEPS. Thus the styrene amount Stw(SEPS) in SEPS (% by weight) is obtained by the following formula by the use of integrated intensity of absorption peaks $I_A$, $I_B$ and $I_C$ that are present in the spectrum region A. (chemical shift of 6.2 to 7.3 ppm expressed in terms of TMS: tetramethoxysilane), spectrum region B (chemical shift of 5.0 to 5.2 ppm) and spectrum region C (chemical shift of 0.6 to 2.4 ppm), respectively.

Stw (SEPS) (% by weight)=104×($I_A$/5)/[104×($I_A$/5)+68×$I_B$+70×{$I_C$−3×($I_A$/5)−7×$I_B$}/10]

A measurement is made of the $^1$H-NMR spectrum of the SEPS under the following conditions.

Solvent: deuterated chloroform

Concentration: 20 mg/0.5 ml

Dissolution temperature: room temperature

Measuring instrument: JNM-LA500 NMR measuring instrument produced by JEOL Ltd.

Pulse width: 11 μs/45°

Pulse repeating time: 9s

Measurement temperature: room temperature

Number of integration: 256 times

② Measurement of the content of styrene polymerized portion in SEBS

Figure 2:
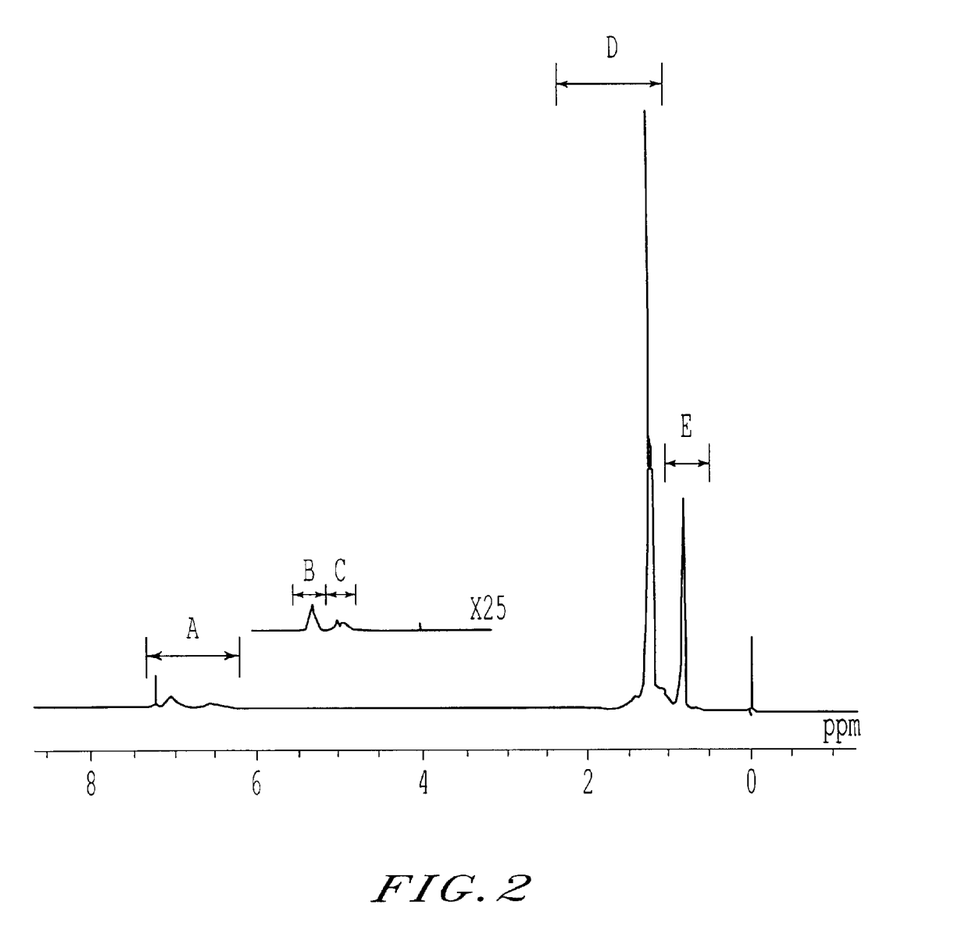

The spectrum as shown in FIG. 2 is obtained as the result of measuring $^1$H-NMR spectrum of SEBS. Thus the styrene amount Stw(SEBS) in SEBS (% by weight) is obtained by the following formula by the use of integrated intensity of absorption peaks $I_A$, $I_B$, $I_c$, $I_D$ and $I_E$ that are present in the spectrum region A (chemical shift of 6.0 to 7.4 ppm expressed in terms of TMS: tetramethoxysilane), spectrum region B (chemical shift of 5.18 to 5.6 ppm), spectrum region C (chemical shift of 4.8 to 5.18 ppm), spectrum region D (chemical shift of 0.97 to 2.3 ppm) and spectrum region E (chemical shift of 0.5 to 0.97 ppm) respectively.

Stw (SEBS) (% by weight)104×($I_A$/5)/[104×($I_A$/5)+54×{($I_B$−$I_c$/2)/2+$I_c$/2}+56×{$I_D$−3×($I_A$/5)−3($I_c$/2)−4($I_B$−$I_C$/2)/2−5×($I_E$/3)}/8]

A measurement was made of the $^1$H-NMR spectrum of the SEBS under the conditions same as that of SEPS.

③ Measurement of melt flow rate (MFR)

Melt flow rate (MFR) is measured at 230° C. under a load of 2.16 kgf in accordance with JIS K7210.

In the above-mentioned component(D), the content of styrene polymerized portion in SEPS and/or SEBS is in the range of 10 to 25% by weight, preferably 13 to 20% by weight. When said content is more than 25% by weight, the copolymer to is made hard and fails to function as a compatibilizing agent thus causing insufficient impact strength. On the other hand, when said content is less than 10% by weight, the copolymer has poor adhesion strength thus causing insufficient impact strength. The MFRs of the SEPS and/or SEBS are each in the range of 1 to 10 g/10 minutes, preferably 2 to 6 g/10 minutes, the MFR, when being less than 1 g/10 minutes, brings about insufficient fluidity, whereas the MFR, when being more than 10 g/10 minutes, leads to insufficient impact strength of molded articles to be produced.

④ Measurement of the density of olefinic elastomer

A measurement is made of the density of olefinic elastomer by the use of a density gradient tube in which ethanol is used as a light liquid and water is used as a heavy liquid in accordance with the description in "Solid Structure of High Polymer" (Kyohritsu Shuppan) pp 308 to 311.

⑤ Measurement of melt index (MI)

Melt flow rate (MFR) is measured at 230 ° C. under a load of 2.16 kgf in accordance with JIS K7210.

The density of olefinic elastomer is in the range of 0.85 to 0.87 g/cm$^3$, preferably 0.855 to 0.867 g/cm$^3$. The density, when being less than 0.85 g/cm$^3$, brings about insufficient hardness of molded articles to be produced, whereas the density, when being more than 0.87 g/cm$^3$, results in too large dimensional change at the time of baking coating (dimensional change at the time of heating) to be usable as a molded article. The MI of the olefinic elastomer is in the range of 0.5 to 5 g/10 minutes, preferably 1 to 5 g/10 minutes. The MI, when being less than 0.5 g/10 minutes, brings about insufficient fluidity, whereas the MFR, when being more than 5 g/10 minutes, leads to insufficient impact strength of molded articles to be produced.

Setting the weight of the foregoing components (D) and (E) on x and y, respectively, the value of x/(x+y) is in the range of 0.05 to 0.3, preferably 0.15 to 0.25. When said value of x/(x+y) is more than 0.3, there is brought about a large dimensional change at the time of baking coating (dimensional change at the time of heating) and remarkable difference in the dimensions between the uncoated portion (untreated surface) and the coated portion (after heating), thereby causing such disadvantage as failure to align a part with corresponding position of an automobile. On the other hand, said value of less than 0.05 leads to lowered impact resistance of molded articles to be produced.

On the basis of the whole polypropylene composition being 100% by weight, the amount of the rubber as the above-mentioned component (2), when being less than 20% by weight, leads to insufficient impact resistance at a low temperature, whereas said amount, when being more than 25% by weight, brings about insufficient rigidity of molded articles to be produced.

(3) Talc

① Measurement of average particle diameter of talc

A measurement is made of the average particle diameter of talc by the use of a particle size distribution measuring instrument of laser ray diffraction scattering system on the basis of the measurement principle of "Particle Measuring Technology {Japan Society of Powder Engineering, Nikkan Kogyo Shimbun Ltd. Nov. 1, 1994 (Heisei-6)}". There is employed as a measuring instrument, SALD-2000 manufactured by Shimadzu Corporation based on the assumption that talc has a refractive index of 1.60 to 1.10i.

② Measurement of chemical composition of talc $SiO_2$ contained in talc is determined by the weighing method for silicon dioxide as described in JIS G1312. MgO contained in talc is determined by the following method: First of all, talc is dissolved in a solution of 5 cc of nitric acid, 20 cc of hydrofluoric acid and 100 cc of sulfuric acid in 10 cc of water, and the solution is evaporated to bone dryness on a platinum basin. Thereafter, the amount of Ca is determined by analyzing the solution obtained by dissolving the resultant residuum on the basin in hydrochloric acid by means of ICP emission spectrometry method. The solution which has been used in the above-mentioned method is titrated with 0.05 mol/l of EDTA to determine the amount of Mg plus Ca, from which the amount of Ca thus obtained is subtracted so as to determine the amount of Mg. Thus the MgO contained in talc is determined thereby.

③ Measurement of wide angle X ray scattering of talc

A measurement is made of wide angle X ray scattering of talc with a rotating target type generating unit produced by Rigaku Denshi Co.,Ltd. under the trade name RU-200. A peak intensity {I (8–10)} which lies in the range of 8 to 10 degrees of the scattering angle (2θ) in a wide angle X ray diffraction image and a peak intensity {I (32±1)} which lies in the range of 32±1 degrees of said angle (2θ) in the image are determined by evaluating the height from the base line in the angle having a maximum value at each of the peaks.

The ratio (R) of the peak intensity which lies in the range of 8 to 10 degrees of the scattering angle (2θ) to the peak intensity which lies in the range of 32±1 degrees of the scattering angle (2θ) is calculated by the following formula:

R=100×I(32±1)/I(8 to 10)

The average particle diameter of talc in the aforesaid component (3) is 3 to 6 μm, preferably 3 to 5 μm. The diameter, when being smaller than 3 μm, brings about liability to agglomeration, thus making it difficult to be finely dispersed at the time of kneading, whereas said diameter, when being larger than 6 μm, leads to insufficiency of rigidity and impact resistance.

In the case where the content of $SiO_2$ contained in the talc is outside the range of 58 to 63% by weight, the content of MgO contained in the talc is outside the range of 30 to 33% by weight, or a peak intensity which lies in the range of 32±1 degrees of the scattering angle (2 θ) in a wide angle X ray diffraction image is more than 10% of a peak intensity which lies in the range of 8 to 10 degrees of the angle (2θ) in the image, the rigidity of molded articles becomes insufficient.

On the basis of the polypropylene composition being 100% by weight according to the present invention, the content of the talc, when being more than 23% by weight, causes insufficient impact resistance of molded articles, whereas said content, when being less than 18% by weight, leads to insufficient rigidity of molded articles.

The automotive parts that are produced by molding the polypropylene composition according to the present invention are excellent in moldability and mechanical strength including excellent flexural modulus of elasticity and tensile break elongation, high rigidity, high impact resistance and the like, and besides, are excellent not only in the balance with the brittleness temperature but also in external appearance without the generation of flow mark, and further have low dimensional change at the time of baking coating and low coefficient of thermal linear expansion. By virtue of the above-mentioned advantages it is made possible to produce molded automotive parts that are thin-walled as compared with conventional automotive parts, and further to achieve the lightweightness of an automobile itself by using the automotive parts produced from the polypropylene composition of the present invention.

In the following, the present invention will be described in more detail with reference to working examples, which however shall never limit the present invention thereto.

<Preparation of catalyst>

① Preparation of magnesium compound

A 6 l glass made reactor equipped with a stirrer was purged sufficiently with nitrogen gas, and charged with approximately 2400 g of ethanol (guaranteed reagent, manufactured by Wako Pure Chemical Industries, Ltd.), 16 g of iodine (guaranteed reagent, manufactured by Wako Pure Chemical Industries, Ltd.) and 160 g of granular metallic magnesium having an average particle diameter of 350 μm so that the components in the reactor were reacted with one another under stirring, heating and reflux conditions until hydrogen gas was no more generated from the reaction system to obtain reaction products in the form of solid. By drying the reaction liquid containing the aforesaid reaction products under reduced pressure, there was obtained a magnesium compound (solid product).

② Preparation of solid catalyst component

A 500 l glass made three-necked flask which has been purged sufficiently with nitrogen gas was charged with 16 g of the magnesium compound obtained in the preceding item ①, 80 ml purified heptane, 2.4 ml of silicon tetrachloride and 2.3 ml of diethyl phthalate. The flask was further charged with 77 ml of titanium tetrachloride under stirring, while maintaining the inside of the system at 90° C. to proceed with reaction at 110° C. for 2 hours. Thereafter, 122 ml of titanium tetrachloride was further added in the flask to proceed with reaction at 110° C. for 2 hours, and then the reaction products were sufficiently washed with purified heptane to produce solid catalyst components.

③ Preparatory polymerization

A 5 l glass made three-necked flask equipped with a stirrer and a thermometer was charged, in a stream of nitrogen, with molecular sieve (4 A) and 4 l of heptane which had been dehydrated by nitrogen bubbling. Subsequently, the flask was further charged with 26.8 mmol of triethylaluminum (TEA), 2.5 mmol of dicyclopentyldimethoxysilane (DCPDMS) and further solid catalyst components in an amount of 5.3 mmol expressed in terms of Ti atom (14.9 g as solid catalyst) at ordinary temperature under stirring. Thereafter, at ordinary temperature under stirring, propylene was continuously fed in the flask in an amount of 0.3 times the solid catalyst. Thus, there was obtained preparatory polymerization catalyst, which was used in the following polymerization.

Synthesis Example 1 (PP-1)

① Polymerization of propylene

A 10 l pressure resistant autoclave which had been purged with nitrogen and dried sufficiently was charged, in a stream of nitrogen, with 6 l of n-heptane which had been sufficiently dehydrated with molecular sieve. Subsequently, the autoclave was charged with 7.5 mmol of triethylaluminum (TEA) and 0.5 mmol of dicyclopentyldimethoxysilane (DCPDMS), and then the nitrogen therein was replaced with propylene at 80° C. Subsequently, there were introduced therein under stirring, hydrogen at 3.6 kg/cm$^2$ by the use of a precision pressure gauge and further propylene until the pressure in the reaction system reached 8.0 kg/cm$^2$. The preparatory polymerization catalyst which had been obtained in the preceding item ③ was fed in the autoclave in an amount of 0.05 mmol expressed in terms of Ti atom and then, propylene was continuously introduced in the autoclave so as to attain a reaction pressure of 8.0 kg/cm$^2$ to proceed with polymerization reaction for 120 minutes at a polymerization temperature maintained at 80° C.

② Copolymerization of propylene/ethylene

After depressurizing the inside of the reaction system, said autoclave was purged with propylene and was charged with hydrogen at 0.015 kg/cm$^2$G. Subsequently, ethylene/propylene was continuously introduced into the autoclave at a flow rate ratio of 0.1/1.0 to proceed with polymerization reaction at 57° C. at a pressure of 5.0 kg/cm$^2$ G for 20 minutes. The inside of the reaction system was again depressurized to collect a small amount of sample, and thereafter was replaced with propylene. Then ethylene/propylene was continuously introduced into the autoclave at a flow rate ratio of 0.3/1.0 without introducing hydrogen to proceed with polymerization reaction at 57° C. at a pressure of 5.0 kg/cm$^2$G for 25 minutes.

After depressurizing the inside of the reaction system to atmospheric pressure, the resultant polymerized powders containing n-heptane were separated at 57° C. by the use of 400 mesh wire net made of stainless steel, and washed with 4 l of heptane at 57° C. under stirring for 30 minutes. Thereafter the polymerized powders were separated by the use of 400 mesh wire net, and dried to obtain 2300 g of propylene/ethylene copolymer. The aforesaid sampled polymer was filtered in the same manner as the foregoing.

Synthesis Example 2 (PP-2)

① Polymerization of propylene

A 10 l pressure resistant autoclave which had been purged with nitrogen and dried sufficiently was charged, in a stream of nitrogen, with 6 l of n-heptane which had been sufficiently dehydrated with molecular sieve. Subsequently, the autoclave was charged with 7.5 mmol of triethylaluminum (TEA) and 0.5 mmol of dicyclopentyldimethoxysilane (DCPDMS), and then the nitrogen therein was replaced with propylene at 80° C. Subsequently, there were introduced therein under stirring, hydrogen at 4.0 kg/cm$^2$ by the use of a precision pressure gauge and further propylene until the pressure in the reaction system reached 8.0 kg/cm$^2$. The preparatory polymerization catalyst which had been obtained in the preceding item ③ was fed in the autoclave in an amount of 0.05 mmol expressed in terms of Ti atom and then, propylene was continuously introduced in the autoclave so as to attain a reaction pressure of 8.0 kg/cm$^2$ to proceed with a first stage polymerization reaction for 120 minutes at a polymerization temperature maintained at 80° C. Subsequently, after the autoclave was purged with propylene, hydrogen at 0.2 kg/cm$^2$G was introduced therein, and the inside pressure was boosted to 4.0 kg/cm$^2$G at a polymerization temperature maintained at 80° C. to proceed with a second stage polymerization reaction for 30 minutes. A calculation was made of the reaction ratio by weight of the first stage reaction to the second stage reaction in the propylene polymerization by the use of the data from a flow integrator. As a result, the reaction amount in the second stage reaction was 8% of the total reaction amount.

② Copolymerization of propylene/ethylene

After depressurizing the inside of the reaction system, a small amount of sample was collected from the propylene homopolymer, and said autoclave was purged with propylene and was charged with hydrogen at 0.01 kg/cm$^2$G. Subsequently, ethylene/propylene was continuously introduced into the autoclave at a flow rate ratio of 0.35/1.0 to proceed with polymerization reaction at 57° C. at a pressure of 5.0 kg/cm$^2$G for 20 minutes.

After depressurizing the inside of the reaction system to atmospheric pressure, the resultant polymerized powders containing n-heptane were separated at 57° C. by the use of 400 mesh wire net made of stainless steel, and washed with 4 l of heptane at 57° C. under stirring for 30 minutes. Thereafter the polymerized powders were separated by the use of 400 mesh wire net, and dried to obtain 2150 g of propylene/ethylene copolymer.

Synthesis Example 3 (PP-3)

① Polymerization of propylene

The procedure in Synthesis Example 1 was repeated to proceed with polymerization reaction except that hydrogen was introduced in the reaction system at 3.2 kg/cm$^2$.

② Copolymerization of propylene/ethylene

The procedure in Synthesis Example 2 was repeated to obtain 2200 g of propylene/ethylene copolymer except that hydrogen was introduced in the reaction system at 0.01 kg/cm$^2$, the flow rate ratio of ethylene/propylene was set to 0.3/1.0, and the polymerization reaction was carried out for 25 minutes.

Synthesis Example 4 (PP-4)

① Polymerization of propylene

The procedure in Synthesis Example 1 was repeated to proceed with polymerization reaction except that hydrogen was introduced in the reaction system at 3.2 kg/cm$^2$G.

② Copolymerization of propylene/ethylene

The procedure in Synthesis Example 2 was repeated to obtain 2150 g of propylene/ethylene copolymer except that hydrogen was introduced in the reaction system at 0.01 kg/cm$^2$G, the flow rate ratio of ethylene/propylene was set to 1.0/1.0, and the polymerization reaction was carried out for 20 minutes.

Synthesis Example 5 (PP-5)

① Polymerization of propylene

The procedure in Synthesis Example 1 was repeated to proceed with polymerization reaction except that hydrogen was introduced in the reaction system at 2.5 kg/cm$^2$G.

② Copolymerization of propylene/ethylene

The procedure in Synthesis Example 2 was repeated to obtain 2430 g of propylene/ethylene copolymer except that hydrogen was introduced in the reaction system at 0.15 kg/cm$^2$G, the flow rate ratio of ethylene/propylene was set to 0.3/1.0, and the polymerization reaction was carried out for 25 minutes.

Synthesis Example 6 (PP-6)

① Polymerization of propylene

The procedure in Synthesis Example 1 was repeated to proceed with polymerization reaction except that use was made of cyclohexylmethyldimethoxysilane (CHMDMS) in place of DCPDMS, and hydrogen was introduced in the reaction system at 2.3 kg/cm$^2$G.

② Copolymerization of propylene/ethylene

The procedure in Synthesis Example 2 was repeated to obtain 2350 g of propylene/ethylene copolymer except that hydrogen was introduced in the reaction system at 0.01 kg/cm²G, the flow rate ratio of ethylene/propylene was set to 0.3/1.0, and the polymerization reaction was carried out for 20 minutes.

The reaction conditions in the items ① and ② in the above-mentioned Synthesis examples 1 to 6 are given in Table 1. In Table 2 are given the results of the measurements by the above-mentioned method, of the component which is insoluble in p-xylene at 25° C. and also in boiling n-heptane, the component which is soluble in p-xylene at 25° C. and polyethylene content.

TABLE 1

| Synthesis Example | 1 | 2 | 3 | 4 | 5 | 6 |
|---|---|---|---|---|---|---|
| Type of PP | PP-1 | PP-2 | PP-3 | PP-4 | PP-5 | PP-6 |
| Propylene polymerization | | | | | | |
| TEA (mmol) | 7.5 | 7.5 | 7.5 | 7.5 | 7.5 | 7.5 |
| Organic silane compound | | | | | | |
| Type | DCPDMS | DCPDMS | DCPDMS | DCPDMS | DCPDMS | CHMDMS |
| Si (mmol) | 0.5 | 0.5 | 0.5 | 0.5 | 0.5 | 0.5 |
| Ti (mmol) | 0.05 | 0.05 | 0.05 | 0.05 | 0.05 | 0.05 |
| First Stage | | | | | | |
| Polymerization temperature (° C.) | 80 | 80 | 80 | 80 | 80 | 80 |
| Propylene partial pressure (kg/cm²G) | 8.0 | 8.0 | 8.0 | 8.0 | 8.0 | 8.0 |
| Hydrogen partial pressure (kg/cm²G) | 3.6 | 4.0 | 3.2 | 3.2 | 2.5 | 2.3 |
| Polymerization time (min) | 120 | 120 | 120 | 120 | 120 | 120 |
| Second stage | | | | | | |
| Polymerization temperature (° C.) | — | 80 | — | — | — | — |
| Propylene partial pressure (kg/cm²G) | — | 4.0 | — | — | — | — |
| Hydrogen partial pressure (kg/cm²G) | — | 0.2 | — | — | — | — |
| Polymerization time (min) | — | 30 | — | — | — | — |
| Reaction ratio at second stage (%)* | — | 8 | — | — | — | — |
| Propylene/ethylene copolymerization | | | | | | |
| First Stage | | | | | | |
| Hydrogen partial pressure (kg/cm²G) | 0.015 | 0.01 | 0.01 | 0.01 | 0.15 | 0.01 |
| Polymerization time (min) | 25 | 20 | 25 | 20 | 25 | 20 |
| Ethylene/propylene flow ratio | 0.1/1.0 | 0.35/1.0 | 0.3/1.0 | 1.0/1.0 | 0.3/1.0 | 0.3/1.0 |
| Polymerization temperature (° C.) | 57 | 57 | 57 | 57 | 57 | 57 |
| Second Stage | | | | | | |
| Hydrogen partial pressure (kg/cm²G) | 0.0 | — | — | — | — | — |
| Polymerization time (min) | 25 | — | — | — | — | — |
| Ethylene/propylene flow ratio | 0.3/1.0 | — | — | — | — | — |
| Polymerization temperature (° C.) | 57 | — | — | — | — | — |
| Reaction ratio at second stage (%)* | 43 | — | — | — | — | — |

Remarks:
Reaction ratio at second stage (%) = reaction amount at second stage/(reaction amount at first stage + reaction amount at second stage) × 100

TABLE 2

| Synthesis Example | 1 | 2 | 3 | 4 | 5 | 6 |
|---|---|---|---|---|---|---|
| Type of PP | PP-1 | PP-2 | PP-3 | PP-4 | PP-5 | PP-6 |
| Component insoluble in p-xylene at 25° C. and boiling n-heptane | | | | | | |
| Stereoregularity index (%) | 99.2 | 99.2 | 99.2 | 99.2 | 99.2 | 98.3 |
| Intrinsic viscosity [η] (dl) | 0.75 | 0.81 | 0.83 | 0.81 | 1.1 | 1.0 |
| Content (% by weight) | 90 | 92 | 91.0 | 91.0 | 91.5 | 93.0 |
| Component insoluble in p-xylene at 25° C. | | | | | | |
| Ethylene unit content (% by weight) | 20 | 33 | 27 | 50 | 30 | 28.5 |
| Intrinsic viscosity [η] (dl) | 9.1 | 6.4 | 5.6 | 6.3 | 2.7 | 5.4 |
| Content (% by weight) | 8.5 | 5.6 | 7.0 | 6.0 | 7.0 | 5.9 |
| Content of polyethylene component (% by weight) | 8 | 12 | 10 | 30 | 13 | 20 |
| MI (g/10 minutes) | 145 | 140 | 138 | 143 | 50 | 80 |

Examples 1 to 9 and Comparative Examples 1 to 11

There were produced polypropylene compositions which had blending compositions as given in Tables 3 and 4 and were to be used for automotive parts. Thus evaluations were made of the physical properties, flow mark and dimensional change upon heating each of the molded articles obtained from each of the polypropylene compositions. The results are collectively given in Tables 3 to 4.

1. Raw materials for blending polypropylene compositions for automotive parts (1) Propylene/ethylene block copolymer
The propylene/ethylene block copolymers PP-1 to 6 that were produced in the above-mentioned Synthesis Examples 1 to 6

(2) Rubber
Styrene/ethylene/propylene/styrene block copolymer (SEPS) and styrene/ethylene/1-butene/styrene block copolymer (SEBS) each as the component (D)
SEPS: styrene content=18% by weight and MFR=4.7 g/10 minutes
SEBS: styrene content=18% by weight and MFR=4.0 g/10 minutes Ethylene/1-butene rubber (EBM) or ethylene/1-octene rubber (EOM) as the component (E)
EBM: density=0.863 g/cm³ and MFR=2.3 g/10 minutes (hereinafter abbreviated to EBM-1)
: density=0.878 g/cm³ and MFR=4.8 g/10 minutes (hereinafter abbreviated to EBM-2)
EOM: density=0.863 g/cm³ and MFR=1.4 g/10 minutes (3) Talc
Talc-1: average particle diameter=4 μm, $SiO_2$ content=59.6% by weight, MgO content=31.3% by weight and R=3.6%
Talc-2: average particle diameter=4 μm, $SiO_2$ content=54.7% by weight, MgO content=32.4% by weight and R=12.6%

2. Kneading method for raw material
A mixture consisting of polyethylene/ethylene block copolymer, rubber and talc was incorporated with a prescribed phenol based antioxidant, thereafter mechanically kneaded at a set temperature of 200° C. at a number of screw revolutions of 900 rpm by the use of an anisotropic twin screw kneading machine manufactured by Kobe Steel Steel Ltd. under the trade name 2 FCM, formed into strands by using an extruder, and granulated with a pelletizer to produce a composite material, which thereafter was sufficiently dried to produce pellets as a raw material for molding.

3. Measurement of physical properties
The pellet obtained in the preceding item 2 was injection molded at an injection temperature of 210° C., an injection pressure of 600 kg/cm² by the use of an injection molding machine to prepare test pieces for the measurement of physical properties. By using the test pieces, measurements were made of flexural modulus of elasticity, Izod impact strength, tensile break elongation and brittleness temperature.

(1) Measurement of flexural modulus of elasticity
The flexural modulus of elasticity was measured according to ASTM D790.

(2) Measurement of Izod impact strength
The Izod impact strength was measured according to ASTM D256 for notched test pieces having a thickness of 3.2 mm at 23° C.

(3) Measurement of tensile break elongation
The tensile break elongation was measured according to ASTM D638.

(4) Measurement of brittleness temperature
The brittleness temperature was measured according to ASTM D746.

4. Evaluation of flow mark and measurement of dimensional change upon heating
The pellet obtained in the preceding item 2 was injection molded at an injection temperature of 240° C. by the use of an injection molding machine to prepare test pieces of 420 mm in length, 100 mm in width and 2 mm in thickness for the evaluation of flow mark and measurement of dimensional change upon heating.

(1) Evaluation of flow mark
The conspicuousness of flow marks generated on the above-mentioned test pieces was visually evaluated according to the criteria as described hereunder.
X: Level that flow mark is conspicuous causing a problem
Δ: Level that flow mark exists but not causing a problem
: Favorable level that flow mark is hardly conspicuous (2) Measurement of dimensional change upon heating
Firstly, the above-mentioned test pieces were allowed to stand at room temperature for one week to stabilize dimensions thereof, measurements were made of the dimension L (mm) of a prescribed portion and design dimension $L_0$ (mm) of the corresponding portion of a mold, and a molding shrinkage factor was calculated by the following formula:

$$\text{Molding shrinkage factor} = 1000 \times (L_0 - L)/L_0$$

Subsequently, the test pieces which were subjected to the measurements of molding shrinkage factors were heated according to the baking coating conditions in which said test pieces were placed in a heating oven set at a temperature 120° C.; taken out therefrom after the lapse of 40 minutes from the time when the oven temperature reached 120° C.; and allowed to stand at room temperature for one week to stabilize the dimensions. Thus a measurement was made of the dimension L' (mm) of a prescribed portion, and a heating shrinkage factor was calculated by the following formula:

$$\text{Heating shrinkage factor} = 1000 \times (L_0 - L')/L_0$$

The difference between the molding shrinkage factor and the heating shrinkage factor that were calculated was taken as the dimensional change upon heating.

Dimensional change upon heating=heating shrinkage factor−molding shrinkage factor

TABLE 3

| Example | 1 | 2 | 3 | 4 | 5 | 6 | 7 | 8 | 9 |
|---|---|---|---|---|---|---|---|---|---|
| PROPYLENE/ETHYLENE BLOCK COPOLYMER | | | | | | | | | |
| Type | PP-1 | PP-1 | PP-2 | PP-2 | PP-2 | PP-2 | PP-2 | PP-2 | PP-3 |
| (% by weight) | 58 | 56 | 58 | 58 | 55 | 55 | 55 | 54.7 | 55 |
| RUBBER | | | | | | | | | |
| SEPS or SEBS | | | | | | | | | |
| Type | SEPS | SEPS | SEBS | SEBS | SEBS | SEBS | SEBS | SEBS | SEBS |
| x (% by weight) | 4 | 4.3 | 4 | 5 | 4.5 | 6.0 | 5.0 | 4.5 | 4.5 |
| Olefinic elastomer | | | | | | | | | |
| Type | EOM | EOM | EOM | EOM | EOM | EOM | EOM | EBM1 | EOM |
| y (% by weight) | 18 | 19.7 | 18 | 17 | 20.5 | 19 | 20 | 20.5 | 20.5 |
| x/(x + y) | 0.18 | 0.18 | 0.18 | 0.23 | 0.18 | 0.24 | 0.20 | 0.18 | 0.18 |
| TALC | | | | | | | | | |
| Type | talc1 | talc1 | talc1 | talc1 | talc1 | talc1 | talc1 | talc1 | talc1 |
| (% by weight) | 20 | 20 | 20 | 20 | 20 | 20 | 20 | 20 | 20 |
| MI (g/10 minutes) | 42 | 38 | 39 | 40 | 35 | 36 | 38 | 43.2 | 40 |
| Flexural modulus of elasticity (MPa) | 2420 | 2260 | 2500 | 2500 | 2320 | 2300 | 2300 | 2300 | 2300 |
| Izod impact strength (J/m) | 250 | 300 | 150 | 170 | 220 | 230 | 210 | 210 | 200 |
| Tensile break elongation (%) | 300 | 400 | 150 | 160 | 200 | 200 | 180 | 170 | 230 |
| Brittleness temperature (° C.) | −26 | −33 | −20 | −22 | −27 | −28 | −28 | −26 | −25 |
| Flow mark | ○ | ○ | ○ | ○ | ○ | ○ | ○ | ○ | ○ |
| Dimensional change upon heating | 1.6 | 1.4 | 1.6 | 1.8 | 1.7 | 1.8 | 1.4 | 1.6 | 1.7 |

TABLE 4

| Comparative Example | 1 | 2 | 3 | 4 | 5 | 6 | 7 | 8 | 9 | 10 | 11 |
|---|---|---|---|---|---|---|---|---|---|---|---|
| PROPYLENE/ETHYLENE BLOCK COPOLYMER | | | | | | | | | | | |
| Type | PP-5 | PP-5 | PP-6 | PP-2 | PP-2 | PP-2 | PP-2 | PP-2 | PP-4 | PP-2 | PP-2 |
| (% by weight) | 55 | 55 | 55 | 55 | 55 | 55 | 65 | 60 | 55 | 55 | 55 |
| RUBBER | | | | | | | | | | | |
| SEPS or SEBS | | | | | | | | | | | |
| Type | SEBS | SEBS | SEBS | none | SEBS | SEBS | SEBS | SEBS | SEBS | SEBS | SEBS |
| x (% by weight) | 4 | 4.5 | 4.5 | — | 12.5 | 2.5 | 4.5 | 4.5 | 4.5 | 4.5 | 4.5 |
| Olefinic elastomer | | | | | | | | | | | |
| Type | EOM | EOM | EOM | EOM | EOM | none | EOM | EOM | EOM | EBM2 | EOM |
| y (% by weight) | 18 | 20.5 | 20.5 | 25 | 12.5 | — | 20.5 | 20.5 | 20.5 | 20.5 | 20.5 |
| x/(x + y) | 0.18 | 0.18 | 0.18 | — | 0.5 | — | 0.18 | 0.18 | 0.18 | 0.18 | 0.18 |
| TALC | | | | | | | | | | | |
| Type | talc1 | talc1 | talc1 | talc1 | talc1 | talc1 | talc1 | talc1 | talc1 | talc1 | talc2 |
| (% by weight) | 20 | 20 | 20 | 20 | 20 | 20 | 10 | 15 | 20 | 20 | 20 |
| MI (g/10 minutes) | 29 | 24 | 31 | 39 | 41 | 42 | 36 | 36 | 35 | 35 | 36 |
| Flexural modulus of elasticity (MPa) | 2220 | 2100 | 1920 | 2350 | 2260 | 2170 | 1840 | 1600 | 2350 | 2400 | 2130 |
| Izod impact strength (J/m) | 280 | 340 | 370 | 100 | 270 | 350 | 230 | 230 | 190 | 170 | 220 |
| Tensile break elongation (%) | 400 | >400 | 400 | 60 | 240 | 290 | 250 | 300 | 50 | 30 | 190 |
| Brittleness temperature (° C.) | −15 | −20 | −30 | −22 | −35 | −40 | −35 | −39 | −30 | −30 | −26 |
| Flow mark | x | x | Δ | ○ | ○ | ○ | ○ | ○ | ○ | ○ | ○ |
| Dimensional change upon heating | 1.5 | 1.3 | 1.5 | 1.4 | 2.2 | 3.1 | —* | —* | 1.6 | 2.0 | 1.8 |

[Remarks]
*not measured because of low flexural modulus of elasticity (rigidity)

What is claimed is: :

1. A polypropylene composition for automotive parts, which comprises:
   (i) 55 to 60% by weight of a propylene/ethylene block copolymer (C) which comprises a combination of 85 to 96% by weight of a propylene/ethylene block copolymer component (A) which has an intrinsic viscosity at 135 ° C. in decalin (η) of 0.6 to 0.95 dl/g and a stereoregularity index of at least 98.8%, and is insoluble in p-xylene at 25 ° C. and also in boiling n-heptane and 4 to 15% by weight of a propylene/ethylene block copolymer component (B) which has an intrinsic viscosity at 135 ° C. in decalin (η) of 5 to 11 dl/g, contains 15 to 37% by weight of a unit that is derived from ethylene, and is soluble in p-xylene at 25 ° C.; the block copolymer combination (C) having at most 15% by weight content of a polyethylene component and having a melt index as determined at 230 ° C. and at 2.16 kgf of 110 to 200;
   (ii) 20 to 25% by weight of a rubber component which is a combination of a styrene monomer containing rubber (D) selected from the group consisting of a styrene/ethylene/propylene/styrene block copolymer, a styrene/ethylene/1-butene/styrene block copolymer and combinations thereof, each copolymer having a melt flow rate as determined at 230 ° C. and at 2.16 kgf of 1 to 10 g/10 min and comprising a styrene polymerized portion of 10 to 25% by weight, an ethylene/l-butene polymerized portion and/or an ethylene/propylene copolymerized portion and an olefinic elastomer (E) prepared from unsaturated aliphatic monomers having a density of 0.85 to 0.87 g/cm$^2$ and a melt index as determined at 230 ° C. and at 2.16 kgf of 0.5 to 5 g/10 min, wherein the content of rubber component (D) {x} and the content of rubber component (E) {y} satisfy the expression: 0.05 <x/(x+y)<0.3; and
   (iii) 18 to 23% by weight of talc which has an average particle diameter as measured by laser diffraction of 3 to 6 μm, an SiO$_2$ content of 58 to 63% by weight, an MgO content of 30 to 33% by weight, and a peak intensity which lies in the range of 32±1 degree of the scattering angle (2 θ) in a wide angle x-ray diffraction image being at most 10% of a peak intensity which lies in the range of 8 to 10 degrees of said angle (2 θ) in said image, said polypropylene composition having a melt index as determined at 230 ° C. and at 2.16 kgf of at least 30 g/10 minutes.

2. The polypropylene composition for automotive parts according to claim 1, wherein the component (A) which is insoluble in p-xylene at 25° C. and also in boiling n-heptane has an intrinsic viscosity at 135° C. in decalin {η} of 0.7 to 0.9 dl/g.

3. The polypropylene composition for automotive parts according to claim 1, wherein the component (A) which is insoluble in p-xylene at 25° C. and also in boiling n-heptane has a stereoregularity index of at least 99.0%.

4. The polypropylene composition for automotive parts according to claim 1, wherein the propylene/ethylene block copolymer comprises 88 to 93% by weight of the component (A) which is insoluble in p-xylene at 25° C. and also in boiling n-heptane.

5. The polypropylene composition for automotive parts according to claim 1, wherein the component (B) which is soluble in p-xylene at 25° C. has an intrinsic viscosity at 135° C. in decalin {η} of 5.5 to 10 dl/g.

6. The polypropylene composition for automotive parts according to claim 1, wherein the component (B) which is soluble in p-xylene at 25° C. contains 19 to 33% by weight of a unit that is derived from ethylene.

7. The polypropylene composition for automotive parts according to claim 1, wherein the propylene/ethylene block copolymer comprises 5 to 10% by weight of the component (B) which is soluble in p-xylene at 25° C.

8. The polypropylene composition for automotive parts according to claim 1, wherein the propylene/ethylene block copolymer (C) has at most 13% by weight of a content of polyethylene component.

9. The polypropylene composition for automotive parts according to claim 1, wherein the propylene/ethylene block copolymer (C) has a melt index at 230° C. and at 2.16 kgf of 130 to 180.

10. The polypropylene composition for automotive parts according to claim 1, wherein the the olefinic elastomer (E) is ethylene/1-butene rubber or ethylene/1-octene rubber.

11. The polypropylene composition for automotive parts according to claim 1, wherein the content of the component (D) {x} and content of the component (E) {y} satisfy the relational expression: 0.15<x/(x+y)<0.25.

12. An automotive part which comprises the polypropylene composition as set forth in claim 1.

* * * * *